United States Patent [19]

Farrell

[11] 4,034,036

[45] July 5, 1977

[54] PARISON CONTROL IN LONGITUDINAL STRETCH

[75] Inventor: John Jerome Farrell, Greenbrook, N.J.

[73] Assignee: Consupak, Inc., Morristown, N.J.

[22] Filed: Oct. 31, 1975

[21] Appl. No.: 627,602

[52] U.S. Cl. .............................. 264/89; 264/40.3; 264/92; 264/97; 425/522

[51] Int. Cl.² .................................. B29C 17/07

[58] Field of Search ............... 264/89, 90, 92, 93, 264/94, 96, 99, 40, 40.3; 425/242 B, 387 B, DIG. 203, DIG. 209, DIG. 215, DIG. 216, DIG. 231, 388

[56] References Cited

UNITED STATES PATENTS

| | | | |
|---|---|---|---|
| 2,326,041 | 8/1943 | Lavallee | 425/388 X |
| 3,347,966 | 10/1967 | Seefluth | 264/97 |
| 3,412,188 | 11/1968 | Seefluth | 264/97 X |
| 3,662,048 | 5/1972 | Turner | 264/89 X |

*Primary Examiner*—Jan H. Silbaugh
*Attorney, Agent, or Firm*—Marvin Feldman; Stephen E. Feldman

[57] ABSTRACT

An injection molded parison is positioned in a mold cavity having a high length to diameter ratio and being provided with means along the length of the cavity to selectively and alternatively exert positive pressure as an air cushion, or negative pressure as a vacuum, on portions of the parison as the parison is expanded through the length of the cavity. The thickness of the expanding parison is thus controlled so that in subsequent expansion in the blow mold, the finished hollow article will have the desired wall thickness.

7 Claims, 5 Drawing Figures

PARISON CONTROL IN LONGITUDINAL STRETCH

This invention relates to parison control in injection blow molding. Specifically this invention relates to longitudinally stretching an injection molded parison wherein the thickness along the length of the expanding parison is controlled, for subsequent blow molding.

It is known in the prior art that it is desirable to expand an injection molded parison in the lengthwise direction prior to radial expansion. This is particularly so in forming a biaxially oriented hollow article, such as a container. The parison is first brought to the orientation temperature and then stretched in the lengthwise direction, usually by mechanical means. This stretching in the longitudinal direction at the orientation temperature induces orientation of the thermoplastic parison in the axial direction. Subsequent radial expansion in blow molding induces orientation in the radial or transverse direction, thus providing biaxial orientation.

One drawback of such prior art approaches is that during the longitudinal stretching the parison thickness varied undersirably along the length of the stretched parison. Certain portions of the parison would be thinned to a point so as to weaken the wall of the blown article whereas other portions would remain relatively thick so that the blown article would have wastage material at those portions. Further in those cases where the configuration of the blown article necessitated that certain portions be thicker than others, there was heretofore no means of controlling that thickness in the longitudinal stretch of the injection molded parison.

It is therefore an object of this invention to provide a method for controlling the thickness of an injection molded parison, in stretching same.

It is another object of this invention to provide a method for controlling the thickness of a parison while inducing orientation in the axial direction.

It is still a further object of this invention to provide a method as aforesaid in which the thickness of the stretched parison is controlled in several zones along the length of the parison.

It is still a further object of this invention to provide a method as aforesaid and in which selectively and alternatively, either negative or positive pressure is applied to specific portions along the length of the longitudinally expanding parison.

It is still a further object of this invention to provide a method for controlling the thickness of while longitudinally expanding a parison by employing substantially only pneumatic means, without mechanical means being exerted on the parison surfaces.

The aforesaid as well as other objects and advantages of the invention will become apparent from the following description taken in connection with the accompanying drawings in which.

Figure 1:
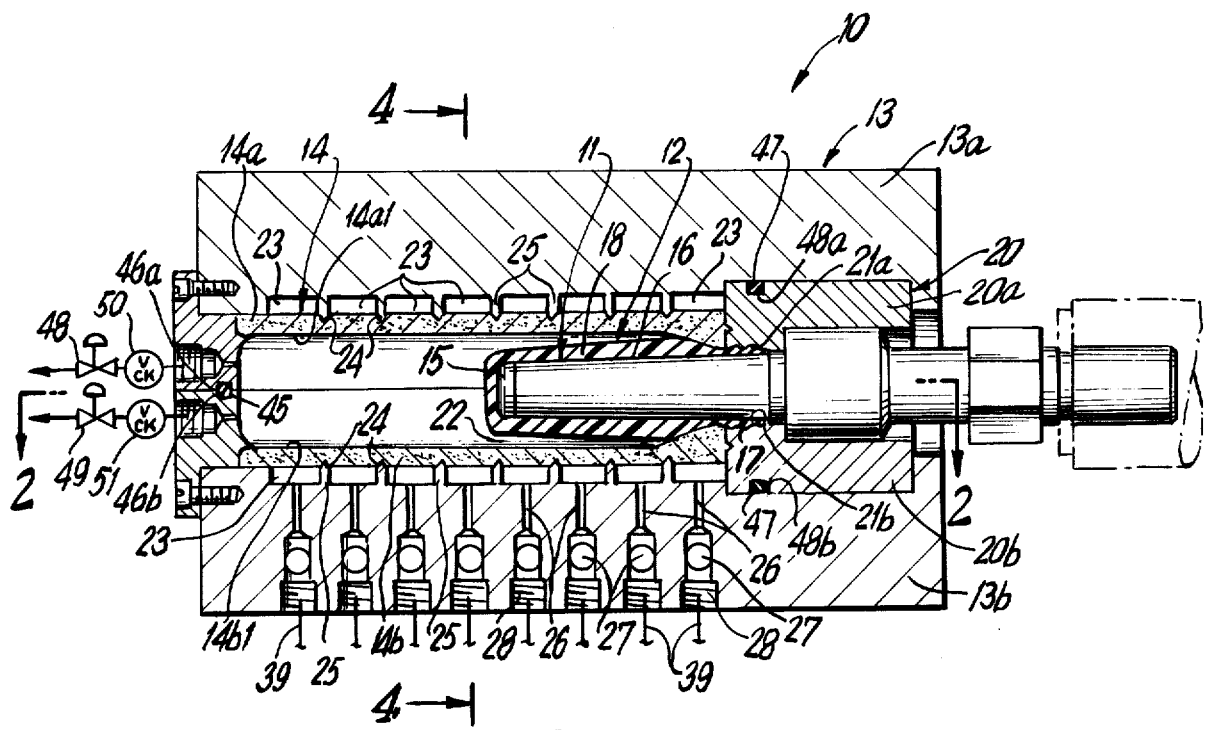
FIG. 1 is a sectional elevational view of the apparatus of this invention with the injection molded parison first positioned in the longitudinal stretch mold.

Referring now to FIG. 1, there is shown the apparatus of this invention generally designated as 10. As shown in FIG. 1 there is a corerod 11 having an injection molded parison 12 thereon and being disposed in a partible longitudinal stretch mold 13 having a cavity substantially greater length than diameter; and a sintered metal insert 14 disposed in said mold cavity for purposes hereinafter appearing.

The core rod 10 is of a similar configuration to the core rod and the mechanism for actuating the core rod to provide blow air, as described in U.S. Pat. No. 3,836,305. Core rod 10 comprises a retractably extensible valve head 15 which is depicted in the seated or retracted position in FIG. 1. It was in this position that the parison 12 was injection molded on surface 16 of the core rod. The injection molding of the parison occurs in a previous operation in the conventional manner. The parison to form a container, generally may be said to comprise a neck of finish portion 17 and a body portion 18. This core rod 11 and injection molded parison 12 thereon are positioned in mold 13.

Mold 13 comprises an upper section 13a and an opposed lower section 13b; section 13a being movable toward and away from section 13b. This partible mold construction permits the insertion and removal of the core rod and parison. The mold 13 further comprises a neck or finish insert 20 comprising an upper section 20a and a lower section 20b, section 20a being movable with section 13a and section 20b being connected to section 13b. The sections 20a, 20b are formed with cavities 21a, 21b to conform with the specific parison neck configuration.

Sintered metal insert 14 is of tubular configuration and is formed of an upper insert section 14a and a lower insert section 14b; insert section 14a being mounted and movable with mold section 13a and insert section 14b being mounted in mold section 13b. With mold 13 closed, the respective interior surfaces 14a1 and 14b1 form a cavity with a clearance 22 for parison body section 18.

The sintered metal insert 14 is of the well known formanious structure, wherein the pores of foramina are sufficiently small so as to prevent thermoplastic material from entering and clogging the pores, but permit the passage of air or other fluids particularly gases therethrough.

The foramina of the sintered metal insert communicate with a plurality of annular chambers 23 (typical) spaced along the length of the mold cavity. A series of spaced parallel circumfrential grooves 24 are formed in sintered metal iserts 14a, 14b; and mold sections 13a, 13b are formed with mating ridges 25 (typical). In this manner of construction air flows through a specific annular chamber will tend to act on a specific corresponding region of the sintered metal insert, and in turn exert a concommitant pressure on the region of parison opposed to the specific insert region. That is the pressure is exerted on the parison in separate distinct annular regions along the length of the mold cavity.

Figure 4:
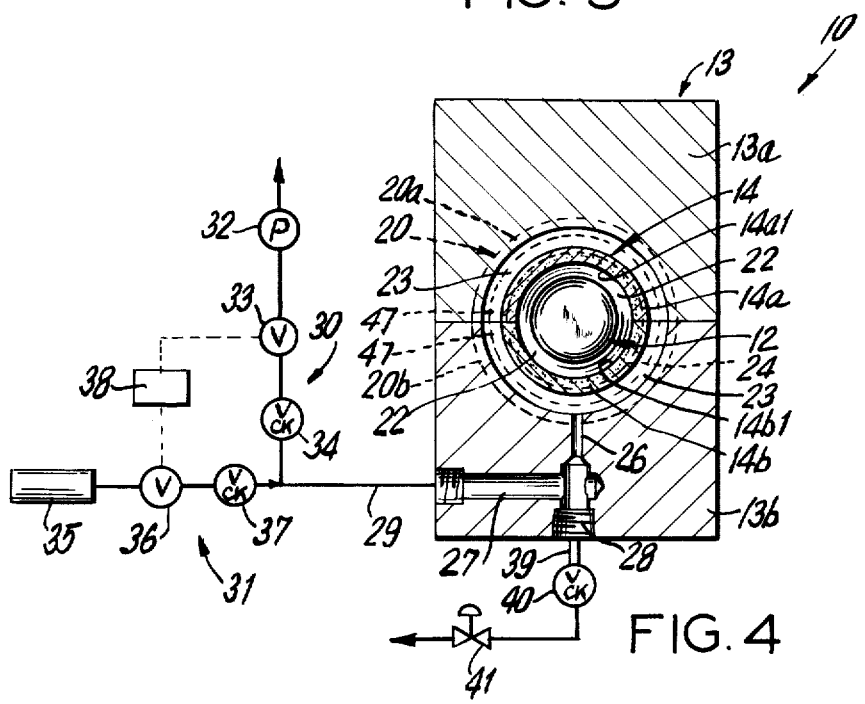
FIG. 4 is a sectional view taken along line 4—4 of FIG. 1 with schematic representation of the air/vacuum supply.

Referring now to FIGS. 1 and 4 there is shown a series of sapced parallel conduits 26 (typical); each of said conduits communicating with a specific annular chamber. Each conduit 26 in turn communicates with conduits 27 and 28. Conduit 27 in turn communicates with fluid pressure line 29 which in turn is connected to both a vacuum or negative pressure means, generally shown as 30, and pressurized air supply means, generally shown as 31. Vacuum means 30 comprises vacuum pump 32, solenoid valve 33, and check valve 34; while pressurized air supply 31, comprises an air pump or cylinder 35; a solenoid valve 36, and a check valve 37.

Solenoid valves 33 and 36 are interconnected to timing actuating mechanism 38 so as to alternatively actuate either valve 33 or valve 36 for the desired period of time. Of course each chamber 23 has a similar fluid pressure system and may coordinate with the other fluid pressure systems to act in sequence. Mechanism 38 will actuate open either valve 33 (normally closed) or valve 36 (normally closed), thereby creating either a vacuum (negative pressure) or pressurized air (positive pressure) in the corresponding specific annular cylindrical region of the sintered insert 14. In this manner of construction each fluid pressure system acting in the aforesaid specific annular cylindrical region, acts to either draw vacuum through the sintered insert to pull the parison in the radial direction or alternatively supply air under pressure through the metal insert to form an air cushion to keep the parison from contacting the insert walls. To insure the fluid pressure exertion on the outside of parison, a fluid pressure seal by means of O-ring 45 is provided at the mold split line. O-ring 45 resides in mating annular grooves 46a of the upper mold section 13a and 46b of the lower mold section 13b. With the movement of mold section 13a, O-ring 45 resides in lower groove 46b. A split O-ring 47 is disposed between neck block 20 and mold sections 13a, 13b, and resides in mating semi-circular or O-ring seats 48a and 48b.

Conduit 28 connects with line 39 on which are mounted check valve 40 and self-regulating pressure relief valve 41. If the pressure caused by system 31 acting on the outside of parison 12 is greater than the internal pressure expanding the parison, valve 41 is pre-set to at a level to relief the outside pressure on the parison and avoid collapse of the parison. Additionally, self-regulating pressure relief valves 48 and 49 are mounted at the remote end portion of mold sections 13a and 13b respectively, and in combination with check valves 50, 51, respectively, further insure that the pressure in the space between the longitudinally expanding parison and the mold cavity is not greater than the parison expansion pressure so as not to inhibit the desired expansion of the parison. Of course valves 48 and 49 may be set at any suitable pressure for parison expansion control.

Figure 2:
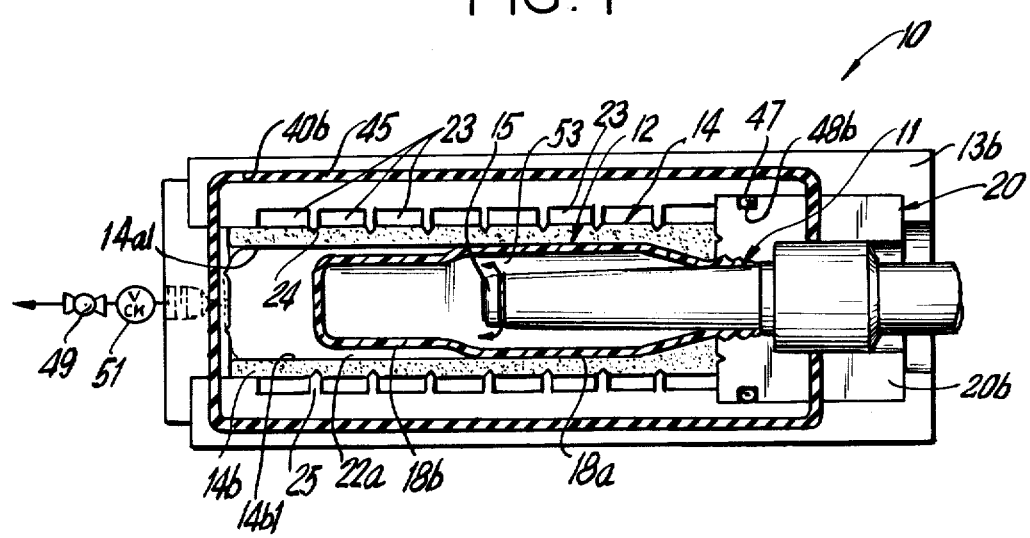
FIG. 2 is a partial sectional view taken along the mold split line 2—2 of FIG. 1, but depicting the parison after some degree of parison stretch has occurred.
Figure 3:
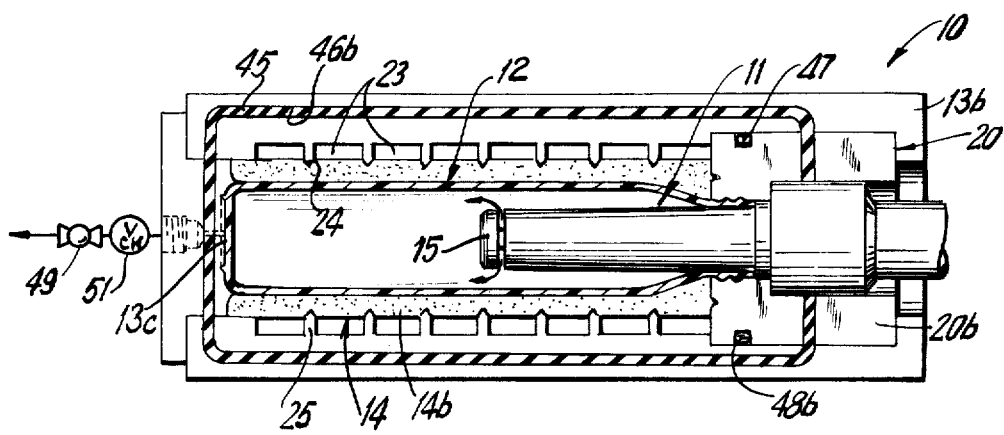
FIG. 3 is still another partial sectional view as in FIG. 2 but shown after completion of the parison longitudinal stretch.

Referring now to FIGS. 2 and 3, there is shown mold section 13b with parison 12 and core rod 11 disposed therein. Parison 12 is depicted with body portion 18 undergoing longitudinal expansion by virtue of blow air entering the parison through inlet 53 of extended valve head 15. That portion of the parison body 18 adjacent the neck 17, is designated as 18a and is shown being held against the sintered insert by virtue of vacuum exerted on portion 18a. In contrast thereto that portion of the parison body more remote the neck than 18a, is designated as 18b and is shown to be spaced from insert 14 by means of the air cushion 22a formed by the pressurized air from those regions of the insert opposed to portion 18b.

In general starting from the end adjacent the parison neck 17, each chamber will exert an air cushion and then vacuum and hold the vacuum until completion of the longitudinal stretching.

In FIG. 3, the parison is shown in its fully stretched position and all chambers 23 are exerting vacuum pull on the parison. To release the parison all chambers 23 are then made to exert a slight air cushion effect. Air that might have been trapped at the remote end 13c of the mold cavity is removed through valves 48 and 49.

Figure 5:
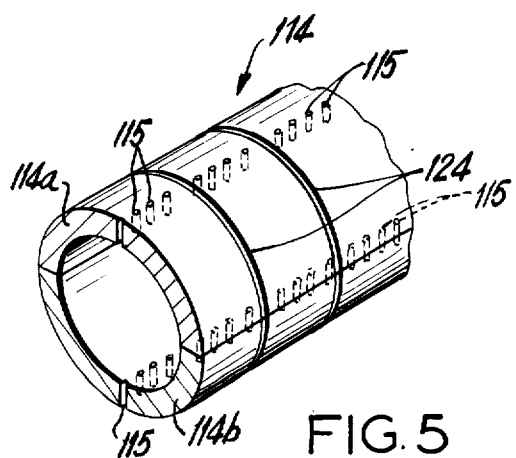
FIG. 5 is a partial perspective view of an alternate embodiment of the mold insert.

Referring now to FIG. 5 there is shown an alternate embodiment for the insert 14; this latter insert being designated 114. Insert 114 is of machined metal construction and comprises an upper section 114a and a lower mating section 114b. A series of circumfrential grooves 124 are similar in construction and use as grooves 24. The orifices or foramina 115 (typical) of insert 114 are formed preferably from laser beams so as to be of minute and yet specific orifice dimensions.

In operation, the core rod and parison are placed in partible mold by the known indexing injection mold mechanisms. The parison has generally first be cooled from its injection temperature to its orientation temperature. After closure of the mold, the blow air is supplied through the now extended core rod valve, to the inside of the parison. About simultaneously therewith the chambers, usually starting in sequence from the neck end, exert an air cushion on the parison to permit the desired degree of extension and then once the desired degree of extension is reached, the timing mechanism closes off the air supply in that region and instead actuates the vacuum draw system in the chamber thereby holding the extended parison opposed to that chamber region and thereby limiting further extension of that particular portion of the parison. Of course any number of cooperating vacuum/air schemes are useful to create an extended parison of any desired configuration. For examples where the finished container configuration dictates that more thermoplastic is required in certain portions the vacuum/air systems for the separate regions may be coordinated to provide a thickened parison in the desired region.

In such longitudinal stretching at the orientation temperature the parison undergoes orientation in the axial direction and to a lesser degree in the radial direction as well.

With subsequent blow molding, further orientation particularly in the radial direction will take place so that the finished container will be biaxially or multiaxially oriented.

It will be understood that many changes in the details of the invention as herein described and illustrated may be made without, however, departing from the spirit thereof or the scope of the appended claims.

What is claimed:

1. A method for controlling the thickness of a parison comprising: providing a fluid on the inside of the parison to expand the parison in the longitudinal direction while exerting a vacuum on a first portion of the outside of the parison to hold that first portion from further longitudinal extension and exerting a fluid cushion on another portion of the outside of the parison to permit longitudinal extension of that another portion so as to control the thickness of the parison as it undergoes longitudinal expansion prior to blow molding.

2. The method of claim 1, wherein the longitudinal expansion of the parison, the vacuum holding of the one portion of the parison, and the fluid cushioning of the other portion of the parison are performed simultaneously.

3. The method of claim 2, wherein the fluid cushion pressure is not greater than the expansion pressure.

4. The method of claim 2, further comprising the first step of conditioning the parison to its orientation temperature so that the parison is oriented in the longitudinal axial direction for subsequent radial orientation in blow molding.

5. The method of claim 4, comprising the first step of providing the parison in a mold wherein the internal cavity of said mold is shaped so that the parison will be substantially longitudinally axially oriented without substantial radial orientation during longitudinal expansion.

6. The method of claim 1, wherein said parison is tubular and wherein said vacuum is effected on a cylindrical portion of the parison and said fluid cushion is effected on another cylindrical portion of the parison.

7. The method of claim 6, wherein said vacuum and fluid cushion are effected on adjacent cylindrical portions.

* * * * *